Patented Nov. 14, 1922.

1,435,335

UNITED STATES PATENT OFFICE.

VINCENZO GATTO RUFFO, OF ROME, ITALY.

MEDICINE AGAINST CONSUMPTION.

No Drawing.  Application filed June 2, 1920.  Serial No. 385,932.

*To all whom it may concern:*

Be it known that I, VINCENZO GATTO RUFFO, a subject of the King of Italy, and residing at 63 Piazza S. Croce in Gerusalemme, Rome, Italy, have invented certain new and useful Improvements in Medicines Against Consumption, of which the following is a specification.

The object of the invention is a medicine for hypodermic use intended to be employed for treating pulmonary or other forms of tuberculosis.

This new medicine is composed of the following ingredients in the approximate proportions hereafter specified.

|  | Grains. |
|---|---|
| Distilled water | 15.4 |
| Carbolic acid | 0.077 |
| Mercury diiodide | 0.015 |
| Disodium methylarsenate | 0.77 |
| Iodium | 0.077 |
| Potassium iodide in sufficient quantity to dissolve. |  |
| Potassium sulphoguaiacolate | 1.54 |
| Iodium chloride | 0.015 |

Of the two chlorides of iodine, the tri chloride is most generally employed as a medicinal agent, and is to be understood as preferred in the above list of ingredients.

What I claim is:

A medicine for treatment of pulmonary and other forms of tuberculosis and adapted for hypodermic use, comprising the following ingredients substantially in the proportions named, distilled water 15.4 grains, carbolic acid 0.077 grains, mercury diiodide 0.015 grains, disodium methylarsenate 0.77 grains, iodium 0.077 grains potassium iodide in sufficient quantity to dissolve, potassium sulphoguaiacolate 1.54 grains, iodium chloride 0.015 grains.

In testimony whereof I have signed my name in the presence of two subscribing witnesses at Rome this seventh day of January 1920.

VINCENZO GATTO RUFFO.

Witnesses:
  ANGELO CARATTONI,
  COULTO FONTONI.